US010249892B2

(12) United States Patent
Lee et al.

(10) Patent No.: US 10,249,892 B2
(45) Date of Patent: Apr. 2, 2019

(54) POWER DISTRIBUTION METHOD AND SYSTEM FOR FUEL CELL VEHICLE

(71) Applicant: Hyundai Motor Company, Seoul (KR)

(72) Inventors: Dong Hun Lee, Gyeonggi-do (KR); Jung Hwan Ryu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 209 days.

(21) Appl. No.: 15/241,792

(22) Filed: Aug. 19, 2016

(65) Prior Publication Data

US 2017/0309935 A1 Oct. 26, 2017

(30) Foreign Application Priority Data

Apr. 20, 2016 (KR) ........................ 10-2016-0048174

(51) Int. Cl.
*H01M 8/04492* (2016.01)
*B60L 7/18* (2006.01)
(Continued)

(52) U.S. Cl.
CPC ......... *H01M 8/04492* (2013.01); *B60L 1/003* (2013.01); *B60L 1/20* (2013.01); *B60L 7/18* (2013.01); *B60L 11/1861* (2013.01); *B60L 11/1881* (2013.01); *B60L 11/1887* (2013.01); *H01M 8/04947* (2013.01); *H01M 8/1004* (2013.01); *H01M 16/006* (2013.01); *H01M 2250/20* (2013.01); *Y02T 10/705* (2013.01);
(Continued)

(58) Field of Classification Search
CPC ......... H01M 8/04492; H01M 8/04947; H01M 8/1004; H01M 16/006; H01M 2250/20; H01M 8/04313; H01M 8/04694; H01M 8/04925; B60L 7/18; B60L 11/1881; B60L 11/1887; B60W 20/13–20/14; Y02E 60/521; Y02T 10/7258; Y02T 90/32
USPC ............ 701/22; 180/65.21, 65.265, 275, 285
See application file for complete search history.

(56) References Cited

U.S. PATENT DOCUMENTS 6,488,345 B1 * 12/2002 Woody ...................... B60L 7/10
                                                            180/165
7,762,364 B2 * 7/2010 Hall .......................... B60K 6/12
                                                            180/65.21
(Continued)

FOREIGN PATENT DOCUMENTS

JP   H07235324 A   9/1995
JP   2005-312243 A   11/2005
(Continued)

*Primary Examiner* — Bao Long T Nguyen
(74) *Attorney, Agent, or Firm* — Mintz Levin Cohn Ferris Glovsky and Popeo, P.C.; Peter F. Corless

(57) ABSTRACT

A power distribution method and system for a fuel cell vehicle is provided. The method includes deducing an amount of moisture in a stack of a fuel cell, when a supply amount of air of the stack of the fuel cell is decreased and determining a state of the fuel cell based on the amount of moisture. Additionally, the method includes deducing allowance power of a regenerative braking of a driving motor using maximum power of the regenerative braking of an air compressor and chargeable power of a high voltage battery based on the determined state. The regenerative braking of the driving motor is then adjusted to prevent actual power of the regenerative braking of the driving motor from exceeding the allowance power of the regenerative braking.

13 Claims, 2 Drawing Sheets

(51) Int. Cl.
*B60L 11/18* (2006.01)
*H01M 8/04828* (2016.01)
*H01M 8/1004* (2016.01)
*H01M 16/00* (2006.01)
*B60L 1/00* (2006.01)

(52) U.S. Cl.
CPC ........ *Y02T 10/7044* (2013.01); *Y02T 10/7258* (2013.01); *Y02T 90/32* (2013.01); *Y02T 90/34* (2013.01)

(56) References Cited

U.S. PATENT DOCUMENTS

| | | | | |
|---|---|---|---|---|
| 9,768,457 | B2* | 9/2017 | Kwon | H01M 8/0488 |
| 9,793,558 | B2* | 10/2017 | Tanaka | H01M 8/0485 |
| 2011/0244346 | A1* | 10/2011 | Chowdhury | H01M 8/04298 |
| | | | | 429/429 |
| 2011/0293972 | A1* | 12/2011 | Naganuma | B60L 11/1887 |
| | | | | 429/9 |
| 2012/0021301 | A1* | 1/2012 | Ohashi | B60K 1/04 |
| | | | | 429/400 |
| 2013/0204490 | A1* | 8/2013 | Pfefferl | B60T 1/10 |
| | | | | 701/36 |
| 2015/0155574 | A1* | 6/2015 | Kwon | H01M 8/04089 |
| | | | | 429/429 |
| 2015/0171444 | A1* | 6/2015 | Tanaka | H01M 8/0485 |
| | | | | 429/446 |
| 2016/0006059 | A1* | 1/2016 | Kwon | B60L 11/1892 |
| | | | | 429/434 |

FOREIGN PATENT DOCUMENTS

| | | |
|---|---|---|
| JP | 2007-123169 A | 5/2007 |
| JP | 2007-157586 A | 6/2007 |
| JP | 2010-146749 A | 7/2010 |
| JP | 2011-019313 A | 1/2011 |
| JP | 2012-129081 A | 7/2012 |
| JP | 2013-239290 A | 11/2013 |
| KR | 10-2009-0123420 | 12/2009 |
| KR | 10-2015-0071098 A | 6/2015 |

* cited by examiner

POWER DISTRIBUTION METHOD AND SYSTEM FOR FUEL CELL VEHICLE

CROSS REFERENCE TO RELATED APPLICATION

This application claims the benefit of Korean Patent Application No. 10-2016-0048174 filed on Apr. 20, 2016, entitled "Power Distribution Method and System for Fuel Cell Vehicle", which is hereby incorporated by reference in its entirety into this application.

BACKGROUND

1. Technical Field

The present invention relates to a power distribution method and system for a fuel cell vehicle capable of improving efficiency and durability of the vehicle by differently performing a regenerative breaking control of a motor and an air compressor based on a moisture state of a stack of a fuel cell, when a supplied amount of air into the stack of the fuel cell is decreased due to a decrease in a load of the fuel cell vehicle.

2. Description of the Related Art

A fuel cell is a type of power generating device that converts the chemical energy into electrical energy by electrochemically reacting the fuel in a stack of a fuel cell, and may be used to supply power to a small electrical/electronic product, particularly, a portable apparatus as well as supply industrial power, home power, and power for driving a vehicle.

As an example of the fuel cell, a polymer electrolyte membrane fuel cell used a power supplying source for driving the vehicle is configured to include a membrane electrode assembly with catalyst electrode layers in which an electrochemical reaction occurs are attached to both sides of an electrolyte membrane in relation to the electrolyte membrane through which hydrogen ions move, a gas diffusion layer that operates to uniformly distribute reaction gases and transfer generated electrical energy, a gasket and coupling mechanism that maintains air-tightness and appropriate coupling pressure of the reaction gases and coolant, and a separating plate using the reaction gases and the coolant.

In the fuel cell, hydrogen, which is the fuel, and oxygen, which is oxidizer, are each supplied to an anode and a cathode of the membrane electrode assembly through a fluid path of the separating plate, wherein the hydrogen is supplied to the anode, and the oxygen is supplied to the cathode. The hydrogen supplied to the anode is decomposed into hydrogen ions and electron ions by catalyst of the electrode layers formed at both sides of the electrolyte membrane. Among these, only the hydrogen ions selectively pass through the electrolyte membrane, which is a cation exchange membrane, and are transferred to the cathodes, and the electron ions are transferred to the cathode through the gas diffusion layer and the separating plate, which are a conductor, at the same time.

In the cathode, a reaction in which the hydrogen ions supplied through the electrolyte membrane and the electron ions transferred through the separating plate encounter oxygen in air supplied to the cathode by an air supplying apparatus to generate water occurs. Particularly, a flow of electrons through an external conducting wire occurs due to an occurred movement of the hydrogen ions, and a current is generated by the flow of electrons.

A hybrid vehicle using the above-mentioned fuel cell has recently been developed. The hybrid vehicle is driven by constant power which is continuously output from the fuel cell. When the power remains, a condenser is charged by surplus power, and when the power is insufficient, lack power is supplementarily output from the condenser. Research related to a regenerative breaking mode among methods for charging the condenser mentioned above has also actively been conducted. A regenerative braking method of a hybrid vehicle of the related art improves fuel efficiency by enabling a regenerative braking together with system stability during high speed driving of the hybrid vehicle including a fuel cell and a condenser.

The matters described as the related art have been provided merely for assisting in the understanding for the background of the present invention and should not be considered as corresponding to the related art known to those skilled in the art.

SUMMARY

An object of the present invention is to provide a power distribution method and system of a fuel cell vehicle capable of improving energy efficiency of a fuel cell as well as preventing a dryout and a flooding phenomenon of the fuel cell by appropriately adjusting a regenerative braking amount of an air compressor and a driving motor of the fuel cell vehicle by considering a moisture state of a stack of a fuel cell.

According to an exemplary embodiment of the present invention, a power distribution method for a fuel cell vehicle may include: deducing, by a controller, an amount of moisture in a stack of a fuel cell, when a supply amount of air of the stack of the fuel cell is decreased; determining, by the controller, a state of the fuel cell based on the amount of moisture; deducing allowance power of a regenerative braking of a driving motor using maximum power of the regenerative braking of an air compressor and chargeable power of a high voltage battery based on the determined state; and adjusting, by the controller, the regenerative braking of the driving motor to prevent actual power of the regenerative braking of the driving motor from exceeding the allowance power of the regenerative braking.

In the deduction of the amount of moisture in the stack of the fuel cell, a water content ratio of a membrane electrolyte assembly (MEA) of the fuel cell may be used. In the determination of the state of the fuel cell, the state of the fuel cell may be determined as a first state when the amount of moisture is a first amount of moisture or less, the first amount of moisture being preset, may be determined as a second state when the amount of moisture exceeds the first amount of moisture and is a second amount of moisture or less, the second amount of moisture being preset to a value greater than the first amount of moisture, and may be determined as a third state when the amount of moisture exceeds the second amount of moisture.

In addition, in the deduction of the allowance power of the regenerative braking of the driving motor, when the state of the fuel cell is determined as the first state, the allowance power of the regenerative braking of the driving motor may be deduced by subtracting the maximum power of the regenerative braking of the air compressor from the chargeable power of the high voltage battery. In the deduction of the allowance power of the regenerative braking of the driving motor, when the state of the fuel cell is determined as the third state, the allowance power of the regenerative braking of the driving motor may be deduced as the chargeable power of the high voltage battery.

The allowance power of the regenerative braking of the driving motor may be power when allowance power of the regenerative braking of the air compressor is set to 0 A. In the deduction of the allowance power of the regenerative braking of the driving motor, when the state of the fuel cell is determined as the second state, the allowance power of the regenerative braking of the driving motor may be deduced as the chargeable power of the high voltage battery.

The power distribution method may further include: after adjusting the regenerative braking of the driving motor, deducing, by the controller, a maximum power of the regenerative braking of the air compressor using the chargeable power of the high voltage battery and the actual power of the regenerative braking of the driving motor; and adjusting, by the controller, the regenerative braking of the air compressor to prevent actual power of the regenerative braking of the air compressor from exceeding the maximum power of the regenerative braking of the air compressor.

According to another exemplary embodiment of the present invention, a power distribution system for a fuel cell vehicle may include: a fuel cell; a driving motor of the fuel cell vehicle; a high voltage battery of the fuel cell vehicle; an air compressor configured to supply air to a stack of the fuel cell; and a controller configured to deduce an amount of moisture in the stack of the fuel cell when a supply amount of air of the stack of the fuel cell is decreased, determining a state of the fuel cell based on the amount of moisture, deducing allowance power of a regenerative braking of the driving motor using maximum power of the regenerative braking of the air compressor and chargeable power of the high voltage battery based on the determined state, and adjusting the regenerative braking of the driving motor to prevent actual power of the regenerative braking of the driving motor from exceeding the allowance power of the regenerative braking.

The controller may be configured to determine the state of the fuel cell as a first state when the amount of moisture is a first amount of moisture or less, the first amount of moisture being preset, as a second state when the amount of moisture exceeds the first amount of moisture and is a second amount of moisture or less, the second amount of moisture being preset to a value greater than the first amount of moisture, and as a third state when the amount of moisture exceeds the second amount of moisture.

When the state of the fuel cell is determined as the first state, the controller may be configured to deduce the allowance power of the regenerative braking of the driving motor by subtracting the maximum power of the regenerative braking of the air compressor from the chargeable power of the high voltage battery. When the state of the fuel cell is determined as the third state, the controller may be configured to deduce the allowance power of the regenerative braking of the driving motor as the chargeable power of the high voltage battery.

When the state of the fuel cell is determined as the second state, the controller may be configured to deduce the chargeable power of the high voltage battery as the allowance power of the regenerative braking of the driving motor, deduce a maximum power of the regenerative braking of the air compressor using the chargeable power of the high voltage battery and the actual power of the regenerative braking of the driving motor, and adjust the regenerative braking of the air compressor to prevent actual power of the regenerative braking of the air compressor from exceeding the maximum power of the regenerative braking of the air compressor.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described with reference to the accompanying drawings.

Figure 1:
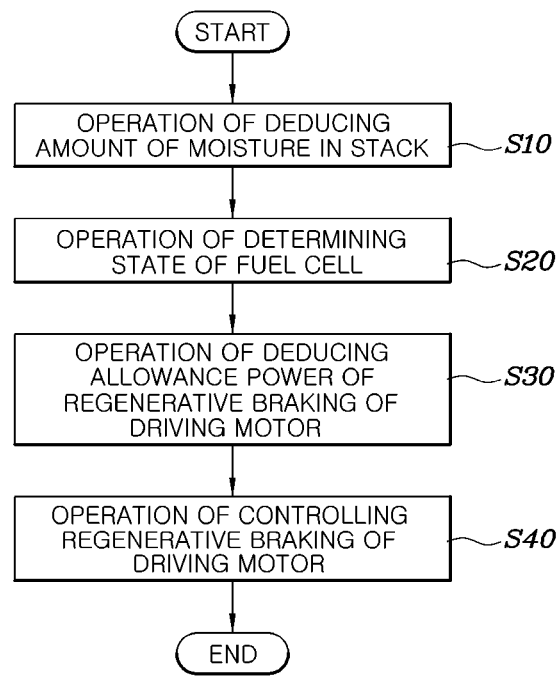
FIG. 1 is a flow chart of a power distribution method for a fuel cell vehicle according to an exemplary embodiment of the present invention.

A power distribution method for a fuel cell 10 vehicle according to the present invention may include deducing, by a controller 50, an amount of moisture in a stack of the fuel cell 10, when a supply amount of air of the stack of the fuel cell 10 is decreased (S10); determining, by the controller 50, a state of the fuel cell 10 based on the amount of moisture (S20); deducing allowance power of a regenerative braking of a driving motor 20 using maximum power of the regenerative braking of an air compressor 40 and chargeable power of a high voltage battery 30 based on the determined state (S30); and adjusting, by the controller 50, a regenerative braking of the driving motor 20 to prevent actual power of the regenerative braking of the driving motor 20 from exceeding the allowance power of the regenerative braking (S40), as illustrated in FIG. 1.

The present invention relates to a technology for varying the application of a regenerative braking control strategy of the driving motor of the vehicle based on the moisture state of the stack of the fuel cell 10 when the fuel cell 10 vehicle reduces a supply amount of air of a stack cathode due to a decrease in a load. A change in the supply amount of air of the stack may be sensed by various methods. For example, a sensor may be disposed in an air supply fluid path to sense the supply amount of air by a direct method, and thus the supply amount of air may be determined indirectly using an open value of an air supply valve.

When the sensed supply amount of air is decreased, an amount of air supplied to the stack of the fuel cell 10 may also be decreased indicating that an output of the fuel cell 10 is decreased. In other words, the load of the fuel cell 10 vehicle is decreased and eventually, the vehicle speed may be decreased. The fuel cell 10 vehicle may be determined to be in a state in which a regenerative braking is possible.

Accordingly, fuel efficiency of the vehicle may be improved using the regenerative braking. However, when the regenerative braking control is performed the same regardless of whether the stack of the fuel cell 10 is in a dry state or a flooding state as in the related art, the fuel efficiency may be improved by the regenerative braking, but the dry or flooding state of the stack of the fuel cell 10 is weighted, thereby making it possible to deteriorate durability of the fuel cell 10. Thus, according to the present invention, when the supply amount of air of the fuel cell 10 is decreased, the amount of moisture in the stack may be determined (S10) as illustrated in FIG. 1 to establish the regenerative braking control strategy of the vehicle based on the stack state of the fuel cell 10.

Various methods may be used to determine an amount of moisture in a stack. For example, a method may consider using a water content ratio of a membrane electrolyte assembly (MEA) of the fuel cell 10. The amount of moisture in the stack of the fuel cell 10 may be deduced using a current and a voltage output by the stack of the fuel cell 10 using the water content ratio of the MEA of the fuel cell 10.

When the amount of moisture in the stack is determined (S10), the state of the fuel cell 10 may be determined using the amount of moisture in the stack (S20). A determination reference may classify the stack of the fuel cell 10 into a dry state, a normal state, and a flooding state. As mentioned above, the dry state corresponds to when a moisture ratio within the fuel cell 10 is minimal, and the flooding state corresponds to when the moisture ratio is excessive. A reference of determining the dry or the flooding based on the moisture ratio in the stack may be differently applied based on a control object and the stack state. However, in general, it may be determined that when the moisture ratio in the stack is about 20% or less, the stack of the fuel cell 10 is in the dry state, and when the moisture ratio in the stack exceeds about 80%, the stack of the fuel cell 10 is in the flooding state. The normal state may be considered to be a state that is between the dry state and the flooding state.

Accordingly, a first amount of moisture mentioned in the present invention indicates an amount of moisture in the stack in which the moisture ratio in the stack is about 20% (e.g., a first amount), and a first state indicates a state in which the stack is dry. Further, a second amount of moisture indicates an amount of moisture in the stack in which the moisture ratio in the stack is about 80% (e.g., a second amount), a second state indicates a state in which the stack is normal, and a third state indicates a state in which the stack is flooding.

Accordingly, when the stack state is classified into three states based on the amount of moisture in the stack, the allowance power of the regenerative braking of the driving motor 20 may be deduced (S30) based on the classified states as illustrated in FIG. 1, and the adjustment of the regenerative braking of the driving motor 20 may be performed (S40) based on the deduced regenerative braking. Therefore, hereinafter, a method for adjusting a regenerative braking based on each state of the stack of the fuel cell 10 from the state in which the stack of the fuel cell 10 is dry to the state in which the stack of the fuel cell 10 is flooding will be described.

First, when the stack of the fuel cell 10 is dry, that is, the state of the fuel cell 10 is determined as a first state, the controller 50 may be configured to determine the allowance power of the regenerative braking of the driving motor 20 by subtracting the maximum power of the regenerative braking of the air compressor 40 from the chargeable power of the high voltage battery 30. When the state of the fuel cell 10 is dry, since the continuous of such a dry state of the stack should be prevented by stopping a supply of air into the fuel cell 10, the air compressor 40 may be stopped at high speed. Therefore, the allowance power of the regenerative braking of the driving motor 20 may be obtained by subtracting the maximum power of the regenerative braking of the air compressor 40 from the chargeable power of the high voltage battery 30.

Second, when the stack of the fuel cell 10 is normal, that is, the state of the fuel cell 10 is determined as a second state, since there is no need to stop the air compressor 40, there is no need to subtract the power based on the regenerative braking of the air compressor 40 from the allowance power of the regenerative braking of the driving motor 20. Therefore, similar to the related art, the chargeable power of the high voltage battery 30 may be deduced as the allowance power of the regenerative braking of the driving motor 20.

However, since the state of the stack of the fuel cell 10 corresponds to when a supply amount of air of a cathode is decreased as described above, the rotation of the motor of the air compressor 40 may be gradually decreased. Accordingly, the regenerative braking of the air compressor 40 may also be performed. Therefore, when the stack of the fuel cell 10 is normal, the allowance power of the regenerative braking of the driving motor 20 may be deduced as the chargeable power of the high voltage battery 30 to improve fuel efficiency of the vehicle.

Thereafter, the maximum power of the regenerative braking of the air compressor 40 may be deduced by subtracting the chargeable power of the high voltage battery 30 from the allowance power of the regenerative braking of the driving motor 20, and the controller 50 may be configured to prevent the actual power of the regenerative braking of the air compressor 40 from exceeding the deduced allowance power of the regenerative braking of the air compressor 40, to thus improve durability of the stack of the fuel cell 10.

Finally, a third case corresponds to when the stack of the fuel cell 10 is flooding, that is, the state of the fuel cell 10 is determined a third state. In particular, in spite of a case in which an output of the fuel cell 10 requires to be decreased based on a decrease in a load of the fuel cell 10, the allowance power of the regenerative braking of the driving motor when the allowance power of the regenerative braking of the air compressor 40 is set to 0 A to minimize a decrease in rotation speed of a motor of the air compressor 40 may be deduced as the allowance power of the regenerative braking of the driving motor 20 to prevent a flooding effect occurring from the fuel cell 10. The moisture deposited on the stack of the fuel cell 10 may be discharged using air supplied by the air compressor 40. Therefore, although the supply amount of air into the cathode of the stack is required to be decreased due to the decrease in the load of the fuel cell 10 vehicle, a driving time of the air compressor 40 may be maximally increased by minimizing the allowance power of the regenerative braking of the air compressor 40 to 0 A and preventing the air compressor 40 from performing the regenerative braking.

Figure 2:
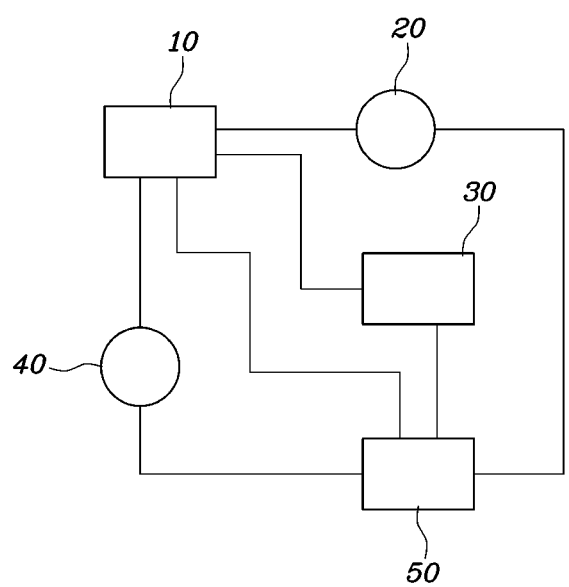
FIG. 2 is a configuration diagram of a power distribution system for a fuel cell vehicle according to an exemplary embodiment of the present invention.

Meanwhile, a power distribution system for a fuel cell 10 vehicle according to the present invention may include a fuel cell 10; a driving motor 20 of the fuel cell 10 vehicle; a high voltage battery 30 of the fuel cell 10 vehicle; an air compressor 40 configured to supply air to a stack of the fuel cell 10; and a controller 50 configured to determine an amount of moisture in the stack of the fuel cell 10 when a supply amount of air of the stack of the fuel cell 10 is decreased, determine a state of the fuel cell 10 based on the amount of moisture, determine allowance power of a regenerative braking of the driving motor 20 using maximum power of the regenerative braking of the air compressor 40 and chargeable power of the high voltage battery 30 based on the determined state, and adjust the regenerative braking of the driving motor 20 to prevent actual power of the regenerative braking of the driving motor 20 from exceeding the allowance power of the regenerative braking, as illustrated in FIG. 2.

In particular, the controller 50 may be configured to determine the state of the fuel cell 10 as a first state when the amount of moisture is a first amount of moisture or less, the first amount of moisture being preset, as a second state when the amount of moisture exceeds the first amount of moisture and is a second amount of moisture or less, the second amount of moisture being preset to a value greater than the first amount of moisture, and as a third state when the amount of moisture exceeds the second amount of moisture.

Further, the controller 50 may be configured to determine the allowance power of the regenerative braking of the driving motor 20 by subtracting the maximum power of the regenerative braking of the air compressor 40 from the chargeable power of the high voltage battery 30 when the state of the fuel cell 10 is determined as the first state, determine the chargeable power of the high voltage battery 30 as the allowance power of the regenerative braking of the driving motor 20 when the state of the fuel cell 10 is determined as the second state, determine the chargeable power of the high voltage battery 30 as the allowance power of the regenerative braking of the driving motor 20 when the state of the fuel cell 10 is determined as the third state, determine the maximum power of the regenerative braking of the air compressor 40 using the chargeable power of the high voltage battery 30 and the actual power of the regenerative braking of the driving motor 20, and adjust the regenerative braking of the air compressor 40 to prevent the actual power of the regenerative braking of the air compressor 40 from exceeding the maximum power of the regenerative braking.

As set forth above, according to the exemplary embodiments of the present invention, the following effects may be obtained.

First, when the fuel cell is dry, the control may be performed to maximize the regenerative braking of the air compressor and the dry out phenomenon of the fuel cell may be prevented, thereby making it possible to improve durability of the fuel cell.

Second, when the stack of the fuel cell contains much moisture, the regenerative braking of the air compressor may be minimized to maintain a moisture removal effect by the air compressor, thereby making it possible to prevent a flooding phenomenon of the fuel cell.

Third, a regenerative braking amount of the driving motor may be allowed to the maximum value allowed by the high voltage battery, thereby making it possible to improve the energy efficiency of the entirety of the fuel cell vehicle.

Although the present invention is shown and described in connection with the specific exemplary embodiments, it is apparent to those skilled in the art that the modifications and variations can be made without departing from the spirit and scope of the invention as defined by the appended claims.

What is claimed is:

1. A power distribution method for a fuel cell vehicle, comprising:
deducing, by a controller, an amount of moisture in a stack of a fuel cell, when a supply amount of air of the stack of the fuel cell is decreased;
determining, by the controller, a state of the fuel cell based on the amount of moisture;
deducing, by the controller, allowance power of a regenerative braking of a driving motor, wherein power of a regenerative braking of an air compressor and chargeable power of a high voltage battery based on the determined state are used for deducing the allowance power and the regenerative braking of the air compressor is performed by controlling rotation speed of a motor of the air compressor; and
adjusting, by the controller, the regenerative braking of the driving motor to prevent actual power of the regenerative braking of the driving motor from exceeding the allowance power of the regenerative braking of the driving motor.

2. The power distribution method of claim 1, wherein in the deducing of the amount of moisture in the stack of the fuel cell, a water content ratio of a membrane electrolyte assembly (MEA) of the fuel cell is considered.

3. The power distribution method of claim 1, wherein in the determining of the state of the fuel cell, the state of the fuel cell is determined as a first state when the amount of moisture is a first amount of moisture or less, the first amount of moisture being preset, is determined as a second state when the amount of moisture exceeds the first amount of moisture and is a second amount of moisture or less, the second amount of moisture being preset to a value greater than the first amount of moisture, and is determined as a third state when the amount of moisture exceeds the second amount of moisture.

4. The power distribution method of claim 3, wherein in the deducing of the allowance power of the regenerative braking of the driving motor, when the state of the fuel cell is determined as the first state, the allowance power of the regenerative braking of the driving motor is deduced by subtracting the maximum power of the regenerative braking of the air compressor from the chargeable power of the high voltage battery.

5. The power distribution method of claim 3, wherein in the deducing of the allowance power of the regenerative braking of the driving motor, when the state of the fuel cell is determined as the third state, the allowance power of the regenerative braking of the driving motor is deduced as the chargeable power of the high voltage battery.

6. The power distribution method of claim 5, wherein the allowance power of the regenerative braking of the driving motor is power when allowance power of the regenerative braking of the air compressor is set to OA.

7. The power distribution method of claim 3, wherein in the deducing of the allowance power of the regenerative braking of the driving motor, when the state of the fuel cell is determined as the second state, the allowance power of the regenerative braking of the driving motor is deduced as the chargeable power of the high voltage battery.

8. The power distribution method of claim 7, further comprising:
  deducing, by the controller, a maximum power of the regenerative braking of the air compressor using the chargeable power of the high voltage battery and the actual power of the regenerative braking of the driving motor; and
  adjusting, by the controller, the regenerative braking of the air compressor to prevent actual power of the regenerative braking of the air compressor from exceeding the maximum power of the regenerative braking of the air compressor.

9. A power distribution system for a fuel cell vehicle, comprising:
  a fuel cell;
  a driving motor of the fuel cell vehicle;
  a high voltage battery of the fuel cell vehicle;
  an air compressor configured to supply air to a stack of the fuel cell; and
  a controller configured to:
    deduce an amount of moisture in the stack of the fuel cell when a supply amount of air of the stack of the fuel cell is decreased;
    determine a state of the fuel cell based on the amount of moisture;
    deduce allowance power of a regenerative braking of the driving motor, wherein power of a regenerative braking of the air compressor and chargeable power of the high voltage battery based on the determined state are used to deduce the allowance power and the regenerative braking of the air compressor is performed by controlling rotation speed of a motor of the air compressor; and
    adjust the braking of the driving motor to prevent actual power of the regenerative braking of the driving motor from exceeding the allowance power of the regenerative braking of the driving motor.

10. The power distribution system of claim 9, wherein the controller is configured to determine the state of the fuel cell as a first state when the amount of moisture is a first amount of moisture or less, the first amount of moisture being preset, as a second state when the amount of moisture exceeds the first amount of moisture and is a second amount of moisture or less, the second amount of moisture being preset to a value greater than the first amount of moisture, and as a third state when the amount of moisture exceeds the second amount of moisture.

11. The power distribution system of claim 10, wherein when the state of the fuel cell is determined as the first state, the controller is configured to deduce the allowance power of the regenerative braking of the driving motor by subtracting the maximum power of the regenerative braking of the air compressor from the chargeable power of the high voltage battery.

12. The power distribution system of claim 10, wherein when the state of the fuel cell is determined as the third state, the controller is configured to deduce the allowance power of the regenerative braking of the driving motor as the chargeable power of the high voltage battery.

13. The power distribution system of claim 10, wherein when the state of the fuel cell is determined as the second state, the controller is configured to deduce the chargeable power of the high voltage battery as the allowance power of the regenerative braking of the driving motor, deduce a maximum power of the regenerative braking of the air compressor using the chargeable power of the high voltage battery and the actual power of the regenerative braking of the driving motor, and adjust the regenerative braking of the air compressor to prevent actual power of the regenerative braking of the air compressor from exceeding the maximum power of the regenerative braking of the air compressor.

* * * * *